C. F. JENKINS.
LIMITING COMBUSTION OF PICTURE FILMS.
APPLICATION FILED AUG. 3, 1918.
1,348,177.
Patented Aug. 3, 1920.
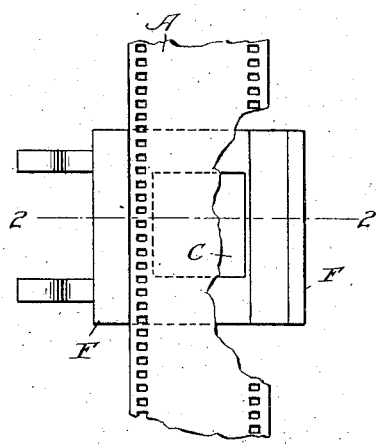
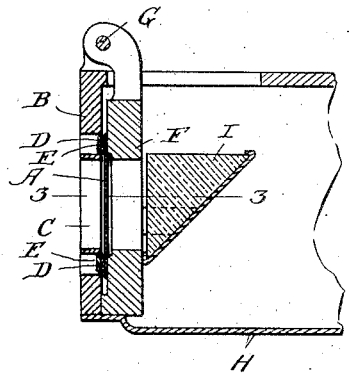
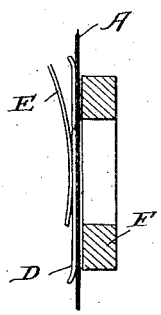
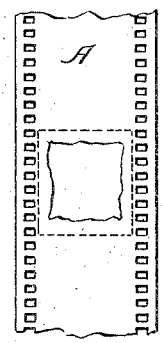

UNITED STATES PATENT OFFICE.

CHARLES FRANCIS JENKINS, OF WASHINGTON, DISTRICT OF COLUMBIA.

LIMITING COMBUSTION OF PICTURE-FILMS.

1,348,177.  Specification of Letters Patent.  Patented Aug. 3, 1920.

Application filed August 3, 1918. Serial No. 248,164.

*To all whom it may concern:*

Be it known that I, CHARLES FRANCIS JENKINS, a citizen of the United States, and resident of Washington, in the District of Columbia, have invented certain new and useful Improvements in Limiting Combustion of Picture-Films, of which the following is a specification, reference being had therein to the accompanying drawing.

Picture film igniting readily and burning with high heat it is desirable to employ expedients of various kinds which together give substantially perfect security against any appreciable loss or danger of any kind from ignition of the film. The present invention provides means whereby ignition of film at the exposure point merely burns out one picture without injuring lineally or laterally adjacent portions, not even the perforated marginal portion alongside the destroyed picture being injured.

In the accompanying drawings,

Figure 1 is a front view of a heat conducting frame.

Fig. 2 is a section on the line 2—2, Fig. 1, but with additional members shown.

Fig. 3 is a section on the line 3—3, Fig. 2.

Fig. 4 is a view showing a film segment having one picture burned out.

The leading feature of this invention is surrounding each film picture while it is exposed to the projecting beam by a heavy-heat-conducting frame between which and the apertured plate there is barely room for the film to pass, whereby combustion ceases at the frame leaving the perforated margins of the film and the adjacent pictures untouched.

In these figures, A represents the film, B the plane plate or front wall of the usual casing, having an exposure opening C, and D, D are bars on each side of the pictures and covering only the lateral margins of the film toward which they are pressed by springs E.

Upon the opposite side of the film a thick heat conducting frame F is pivoted to swing, toward and from the film, about an axis G. This frame closely surrounds the picture area and its inner face is vertically grooved to the depth of a few thousandths of an inch and pressed toward the apertured plate by any suitable spring. The side of the frame most distant from the pivot preferably extends beyond the lateral edge of the film and fits against the apertured plate, and a door H shuts against this side of the frame and the margin of the apertured plate which is usually the front wall of a casing for the film feeding devices. The frame thus leaves exposed each picture brought to the exposure point but covers all surrounding parts, and from the construction it follows that the perforated lateral portions of the film are pressed gently between the frame and the bars D, while the body of the film is not pressed at all but has barely room to pass freely. If by mischance the film be ignited by the projecting light beam, the little rectangular portion surrounded by the frame and bearing a single picture, is quickly consumed but the little heat generated by a single thickness of film is rapidly abstracted by the conducting frame and combustion ceases with absolute certainty at this frame, the result being that under ordinary conditions a square hole is burned in the middle part of the film, no substantial injury to film or machine being caused and only momentary delay being necessarily occasioned.

Film passing to and from the exposure opening is further protected by the beam deflecting prism I which obstructs any flame that may emerge from the passage in the frame or block F. The prism is usually supported by the frame F and swings therewith.

What I claim is:

1. In motion picture machines, the combination with a casing having an exposure aperture in its front wall and provided with a door, of a heavy heat conducting frame surrounding said aperture, arranged to be moved to and from the inner face of the wall and provided with a shallow central vertical channel, of spring-pressed bars for holding the perforated marginal portions of the film in contact with the vertical sides of the frame, access to the door side of the film passage being cut off normally by the projecting marginal portion of the frame and the closely fitting door.

2. In a motion picture machine, the combination with a plate provided with the usual film exposing opening, of a thick heat conducting frame closely adjacent to the plate in position to surround said opening and form a passage extending rearward therefrom, and a light deflecting prism, in proximity to the rear face of the frame, extending across said passage.

In testimony whereof I hereunto affix my signature.

CHARLES FRANCIS JENKINS.